US012786172B2

(12) United States Patent
Adir et al.

(10) Patent No.: US 12,786,172 B2
(45) Date of Patent: Nov. 3, 2026

(54) QUERYING FULLY HOMOMORPHIC ENCRYPTION ENCRYPTED DATABASES USING CLIENT-SIDE PREPROCESSING OR POST-PROCESSING

(71) Applicant: International Business Machines Corporation, Armonk, NY (US)

(72) Inventors: Allon Adir, Kiryat Tivon (IL); Michael Mirkin, Haifa (IL); Ramy Masalha, Kafr Qari (IL); Ehud Aharoni, Kfar Saba (IL); Omri Soceanu, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 670 days.

(21) Appl. No.: 17/473,027

(22) Filed: Sep. 13, 2021

(65) Prior Publication Data

US 2023/0085239 A1 Mar. 16, 2023

(51) Int. Cl.
*H04L 9/40* (2022.01)
*G06F 16/2458* (2019.01)
*H04L 9/00* (2022.01)

(52) U.S. Cl.
CPC ...... *H04L 63/0428* (2013.01); *G06F 16/2462* (2019.01); *H04L 9/008* (2013.01)

(58) Field of Classification Search
CPC .. H04L 63/0428; H04L 9/008; G06F 16/2462
USPC .......................................................... 713/189
See application file for complete search history.

(56) References Cited

U.S. PATENT DOCUMENTS

| | | | | |
|---|---|---|---|---|
| 8,924,928 | B1 * | 12/2014 | Belovich | H04L 63/101 706/45 |
| 10,015,007 | B2 | 7/2018 | Bacon et al. | |
| 10,019,709 | B2 * | 7/2018 | Abbott | H04L 63/0421 |
| 10,594,472 | B2 * | 3/2020 | Ding | H04L 9/008 |
| 10,735,181 | B2 | 8/2020 | Bent et al. | |
| 2008/0240443 | A1 * | 10/2008 | Vuillaume | H04L 9/3247 380/277 |
| 2011/0110525 | A1 * | 5/2011 | Gentry | H04L 9/14 380/285 |
| 2017/0235969 | A1 * | 8/2017 | Kamara | G06F 16/284 713/159 |
| 2018/0060604 | A1 * | 3/2018 | Bent | H04L 9/30 |
| 2019/0036678 | A1 * | 1/2019 | Ahmed | H04L 9/008 |
| 2020/0327252 | A1 | 10/2020 | Mcfall et al. | |

OTHER PUBLICATIONS

Akavia et al., "Secure Search via Multi-Ring Fully Homomorphic Encryption", Cybersecurity Research Center, Academic College of Tel-Aviv Jaffa, Oct. 15, 20218, 29 pages.
Anonymous, "Secure Computation Architecture for Client-side Encryption", IP.com No. IPCOM000263004D, Jul. 21, 2020, 6 pages.

(Continued)

*Primary Examiner* — Teshome Hailu

(57) ABSTRACT

An example system includes a processor to receive a preprocessed query from a client device for a fully homomorphic encryption (FHE) encrypted database. The processor can execute the preprocessed query on the FHE encrypted database to generate a response. The processor can transmit a partially-processed response to the client device, which can post-process the query computation.

25 Claims, 14 Drawing Sheets

100A

(56) References Cited

OTHER PUBLICATIONS

Gahi et al., "A Secure Database System using Homomorphic Encryption Schemes", The Third International Conference on Advances in Databases, Knowledge, and Data Applications, 2011, 5 pages.
Mell et al., "The NIST Definition of Cloud Computing", National Institute of Standards and Technology, Sep. 2011, Special Publication 800-145, 7 pages.
Tu et al., "Processing Analytical Queries over Encrypted Data", MIT CSAIL, Mar. 2013, 12 pages.
Y.A.M. Kortrkaas (Yoep), "Access Pattern Hiding Aggregation over Encrypted Databases", University of Twente, Faculty of Electrical Engineering, Mathematics, and Computer Science Services and Cyber Security, Oct. 7, 2020, 17 pages.
Akavia et al. "Secure Data Retrieval on the Cloud: Homomorphic Encryption meets Coresets", IACR Transactions on Cryptographic Hardware and Embedded Systems, 2019, pp. 80-106.
Akavia et al. "Setup-free secure search on encrypted data: Faster and post-processing free", Proceedings on Privacy Enhancing Technologies, 2019, pp. 87-107.
Bösch et al. "A survey of provably secure searchable encryption", ACM Computing Surveys (CSUR), 2014, pp. 1-51.

* cited by examiner

100A

100B

200

300

400

600

```
+----------------------+------------------------------------------+---+----------------------------------------
-----+
| | Bit 0 | | Bit ℓ |
+----------------------+------------------------------------------+---+----------------------------------------
-----+
|Rows 1 to k | ct1[0]=Enc(c1[0],...,ck[0]) | | ct1[ℓ]=Enc(c1[ℓ],...,ck[ℓ]) |
+
|Rows k+1 to 2k | ct2[ℓ]=Enc(ck+1[0],...,c2k[0]) |...|ct2[ℓ]=Enc(ck+1[ℓ],...,c2k[ℓ]) |
+----------------------+------------------------------------------+---+----------------------------------------
-----+
| ... | | | |
+----------------------+------------------------------------------+---+----------------------------------------
-----+
```

FIG. 11

QUERYING FULLY HOMOMORPHIC ENCRYPTION ENCRYPTED DATABASES USING CLIENT-SIDE PREPROCESSING OR POST-PROCESSING

BACKGROUND

The present techniques relate to processing queries. More specifically, the techniques relate to processing queries in databases encrypted using fully homomorphic encryption (FHE). Homomorphic encryption is a form of encryption that permits users to perform computations on its encrypted data without first decrypting the encrypted data. These resulting computations are left in an encrypted form which, when decrypted, result in an identical output to that produced had the operations been performed on the unencrypted data. Fully homomorphic encryption (FHE) is a homomorphic encryption scheme that allows the evaluation of arbitrary circuits composed of multiple types of gates of unbounded depth, and is the strongest notion of homomorphic encryption. The fourth generation of FHE, known as the CKKS scheme, released in 2017 by Cheon, Kim, Kim, and Song, supports approximate arithmetic over the encrypted values which are treated as real numbers with some precision. Like other schemes, CKKS also includes bootstrapping of the ciphertext after enough products have been computed, in order to enable more products as required by the computation.

In encrypted database solutions, there is a trade-off between security and usability. This trade-off leads to a situation where some solutions may reduce security to achieve usability. However, such an approach may be dangerous and can lead to information leakage. Current practical solutions for encrypted DB mostly guarantee security against snapshot attackers. For example, these solutions may assume that a snapshot attacker can access to the server only at certain point in time. However, such solutions may not be practical attack model for a client-server database, in which the server inherently has possession of the data over time and can keep logs.

On the other hand, there are some solutions that do not leak any information, such as those solutions that may use fully homeomorphic encryption (FHE). However, such solutions are often considered too slow for practical use. In particular, such solutions may have a query time that is too long. Additionally, some existing database FHE solutions often use a scheme that encrypts plaintexts in small fields with modulo small prime. These solutions may lead to a difficulty in the execution of aggregation queries such as sum, count, average and standard deviation. In particular, for these solutions, aggregation may very expensive, even a simple SUM operation may be inefficient if mod 2 fields are used. Moreover, multiplication operations may be particularly inefficient. In other solutions, using mod p for a relative small p and Fermat's little theorem, the plain text domain may be limited.

SUMMARY

According to an embodiment described herein, a system can include processor to receive a preprocessed query from a client device for a fully homomorphic encryption (FHE) encrypted database. The processor can also further execute the preprocessed query on the FHE encrypted database to generate a response. The processor can also transmit the response to the client device. Thus, the system provides a more efficient processing of queries on FHE encrypted databases using client pre-processing. Optionally, the preprocessed query includes negated bit values of the binary representation of a value being compared by a query corresponding to the preprocessed query. In this embodiment, generating the negated bit values at a client device may increase efficiency. Preferably, the preprocessed query is executed using an optimized hybrid bitwise comparison function that includes a squaring of a summation of bitwise comparisons. In this embodiment, processing the negated bit values at a client device may substantially increase efficiency. Optionally, the query includes a comparison. In this embodiment, a comparison query may be efficiently processed.

According to an embodiment described herein, a system can include processor to receive a query from a client device for a fully homomorphic encryption (FHE) encrypted database. The processor can also further partially process the query using the FHE encrypted database. The processor can also transmit the partially-processed query to the client device. Thus, the method provides a more efficient processing of queries on FHE encrypted databases by using client post-processing. Optionally, the processor is to calculate a sum of ciphertexts to be included in the partially-processed query. In this embodiment, the server device may save resources by having the client device decrypt the ciphertexts. Optionally, the processor is to calculate a count to be included in the partially-processed query. In this embodiment, the count may be used to more efficiently calculate queries at the client device. Optionally, the query includes an average query, and the processor is to calculate a sum and a count for the standard deviation query. In this embodiment, the sum and count may be used to more efficiently calculate queries at the client device. In this embodiment, an average query may be efficiently processed. Optionally, the query includes a standard deviation query, where the processor is to calculate a sum and a count for the standard deviation query. In this embodiment, a standard deviation query may be efficiently processed.

According to another embodiment described herein, a method can include receiving, via a processor, an input query for a fully homomorphic encryption (FHE) encrypted database. The method can further include preprocessing, via the processor, the query to generate a preprocessed query. The method can also further include transmitting, via the processor, the preprocessed query to a server with the fully homomorphic encrypted database. The method can also include receiving, via the processor, a response to the preprocessed query from the server. Thus, the method provides a more efficient processing of queries on FHE encrypted databases using client pre-processing. Optionally, preprocessing the query includes calculating negated bit values of the binary representation of a value being compared by a query corresponding to the preprocessed query. In this embodiment, processing the negated bit values at the client device may increase efficiency. Preferably, the negated bit values are to be used in an optimized hybrid bitwise comparison function. In this embodiment, processing the negated bit values in an optimized hybrid bitwise comparison function substantially increases efficiency. Optionally, the input query includes a comparison. In this embodiment, comparison functions may be executed in a more efficient manner.

According to another embodiment described herein, a method can include receiving, via a processor, a query for a fully homomorphic encrypted database. The method can further include transmitting, via the processor, the query to a server with the fully homomorphic encrypted database.

The method can also further include receiving, via the processor, a partially-processed query from the server. The method can also include post-processing, via the processor, the partially-processed query to generate a response to the query. Thus, the method provides a more efficient processing of queries on FHE encrypted databases using client post-processing. Preferably, post-processing the partially-processed query includes decrypting the partially-processed query. In this embodiment, operations not able to be fully performed on the server may be achieved by decryption at the client device. Preferably, post-processing the partially-processed query includes summing decrypted values of the partially-processed query. In this embodiment, further efficiency may be achieved by the summation performed at the client device. Optionally, post-processing the partially-processed query includes dividing decrypted values of the partially-processed query by a number received in the partially-processed query. In this embodiment, further efficiency may be achieved by the division performed at the client device. Optionally, post-processing the partially-processed query includes summing values of an indicator vector. In this embodiment, further efficiency may be achieved by the summation at a client device. Optionally, post-processing the partially-processed query includes calculating a division and square root portion of a standard deviation calculation. In this embodiment, further efficiency may be achieved by the division and square root being performed at the client device.

According to another embodiment described herein, a computer program product for querying fully homomorphic encryption (FHE) databases can include computer-readable storage medium having program code embodied therewith. The computer readable storage medium is not a transitory signal per se. The program code executable by a processor to cause the processor to receive a query for a fully homomorphic encrypted database. The program code can also cause the processor to preprocess the query to generate a preprocessed query. The program code can also cause the processor to transmit the preprocessed query to a server with the fully homomorphic encryption (FHE) encrypted database. The program code can also cause the processor to receive a response to the preprocessed query from the server. Thus, the method provides a more efficient processing of queries on FHE encrypted databases using client pre-processing. Optionally, the program code can also cause the processor to post-process the response from the server, where the response includes a partially-processed query. In this embodiment, further efficiency can be achieved by partially processing the query at the server. Optionally, the program code can also cause the processor to also further decrypt the partially-processed query. In this embodiment, operations not able to be fully performed on the server may be achieved by decryption at the client device. Optionally, the program code can also cause the processor to sum decrypted values of the partially-processed query. In this embodiment, further efficiency may be achieved by the summation at the client device. Optionally, the program code can cause the processor to divide decrypted values of the partially-processed query by a number received in the partially-processed query. In this embodiment, further efficiency may be achieved by the division performed at the client device.

BRIEF DESCRIPTION OF THE SEVERAL VIEWS OF THE DRAWINGS

FIG. 11 is a diagram of an example matrix representing an encrypted database column according to row blocks and bit positions.

DETAILED DESCRIPTION

Figure 1A:
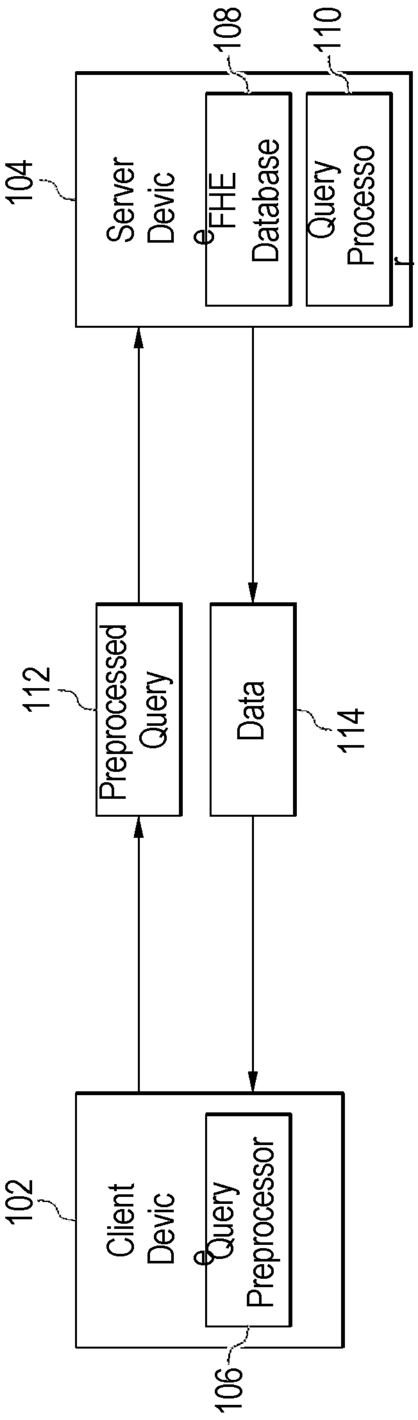
FIG. 1A is a block diagram of an example system for querying fully homomorphic encryption (FHE) encrypted databases using client-side preprocessing.

With reference now to FIG. 1A, a block diagram shows an example system for querying fully homomorphic encryption (FHE) encrypted databases using client-side preprocessing. The example system is generally referred to by the reference number 100A. FIG. 1A includes a client device 102. The system 100A further includes a server device 104 communicatively coupled to the client device 102. The client device 102 includes a query preprocessor 106. The server device 104 includes a fully homomorphic encrypted (FHE) database 108 and a query processor 110. The server device 104 is shown receiving a preprocessed query 112 from the client device and sending data 114 to the client device 114.

In the example of FIG. 1A, the FHE database 108 may be encrypted using the CKKS FHE scheme. In particular, columns intended for comparison may be encrypted using a binary representation. In addition, columns meant for aggregation may be encrypted with regular numerical representations.

Still referring to FIG. 1A, in some examples, the query processor 110 may be able to efficiently compare binary columns of the FHE database 108. Every column in the FHE database 108 to be used for comparison may be encrypted using binary representation. For example, if every CKKS cipher includes k slots, and the values of k rows of a certain L-bit column C={c1,c2, . . . ,ck} are to be encrypted, then every element of the column may first be converted to its binary representation, such that the jth bit from least significant bit (LSB) to most significant bit (MSB) of the ith element in the column is denoted with ci[j]. Next, every bit of every k consecutive rows in the column are encrypted into one single k-slot cipher text. Thus, in various examples, every column may be represented as a matrix, where the columns are bit positions and the rows are groups of k rows in the original column. As used herein, the jth ciphertext representing the jth group of k values of the jth bit may be denoted as [j].

For example, the matrix may take the form shown in FIG. 11, where ||Bit 0||Bit1| indicates that the same holds for all the bits from 1 to 1-1 as well, and every k rows is a block. Thus, rows 1 to k are a $1^{st}$ block, rows k+1 to 2k are a $2^{nd}$ block, etc. Because CKKS operates on real numbers and not on finite fields, then, in order to compare two strings of binary ciphertexts ct and a user value v, both of length e, the following hybrid bitwise comparison function might be used:

$$isEq(a, b) = \prod_{i \in [w]} \left(1 - (a[i] - b[i])^2\right) \quad \text{Eq. 1}$$

where $\alpha = c_r$, b=v. Eq. 1 generates a value of 1 for each bitwise comparison if α[i]=b[i], or 0 if α[i]≠b[i]. The summation of these bitwise comparisons is used to detect whether the two ciphertexts are similar or not. However, Eq. 1 may not be efficient because a square is calculated for each bitwise comparison. Therefore, in various examples, the client device 102 may send a negated value $\bar{v}$={1−v[0], 1−v[1] . . . , 1−v[l]} in the preprocessed query 112, also referred to as $\bar{b}[i]$ in Eq. 2 below. Alternatively, in some examples, the client device 102 may send b=v and the server device 104 can calculate $\bar{b}=\bar{v}$ after receiving an unprocessed user value v from the client device 102. In some examples, the function of Eq. 1 may accordingly be replaced by the optimized hybrid bitwise comparison function:

$$isEqOpt(a, b) = \left(\prod_{i \in [w]} \left(a[i] - \bar{b}[i]\right)\right)^2 \quad \text{Eq. 2}$$

Thus, instead of using additional squaring for each two bits, the squaring may be replaced with a single squaring after the multiplication of all the bits. This does not change the result as the intermediate bit comparisons are 0, 1 or −1, the result of the multiplication would be 1 or −1 if the strings are equal and 0 otherwise. The square power ensures that the result would be 1 or 0. Using Eq. 2 instead of Eq. 1 for an equality test spares half of the multiplication and therefore improves running time significantly.

In various examples, a similar optimization can be applied to other comparison functions that use an equality test, such as a greater-than comparison function. For example, a similar optimization can be used as in Eq. 2 because the formula for "isGreater" includes the computation of "isEqual". Thus, when computing the "isEqual" for "isGreater", the optimization in Eq. 2 can be used. For example, greater-than can be calculated using the following equation:

$$isGreater(a, b) = \sum_{i \in [w] \setminus \{0\}} a[i] \cdot (1 - b[i]) \cdot isEq\left(a[0{:}\ i-1],\ b[0{:}\ i-1]\right) + a[0] \cdot (1 - b[0]) \quad \text{Eq. 3}$$

In various examples, after comparing the column to a value chosen by the user, an indicators vector may be generated for every block of k rows. For example, the indicators vector may include 1s in matching rows and 0s in non-matching rows. The indicators vector may then be used to filter values in the column that are to be aggregated. In some examples, the filtration can be achieved by multiplying the indicators vector by the aggregated column for every block. The aggregation itself may then be performed. For example, for a regular sum query, the filtrated column may be summed by summing all the cipher texts. After the summation, one cipher text that encrypts k values may be generated. In some examples, the cipher text may be sent to the client device 102 for decryption and summing, as described in FIG. 1B. Alternatively, the cipher text may be summed by the server device 104. In some examples, the server device 104 may sum the cipher text using a "rotate-and-sum" algorithm. For example, the server device 104 can apply a sequence of rotations and summations on a cipher text to compute the sum of its slots.

In various examples, to compute a count query, the method described above for calculating a regular sum query may be used. However, in computing the count query, the summation may only be performed on the indicators vector without multiplying the indicators vector by another column.

It is to be understood that the block diagram of FIG. 1A is not intended to indicate that the system 100A is to include all of the components shown in FIG. 1A. Rather, the system 100A can include fewer or additional components not illustrated in FIG. 1A (e.g., additional client devices, queries, data, processors, or additional server devices, etc.). In some examples, the system 100A may further include components such as the query post-processor shown in FIG. 1B.

Figure 1B:
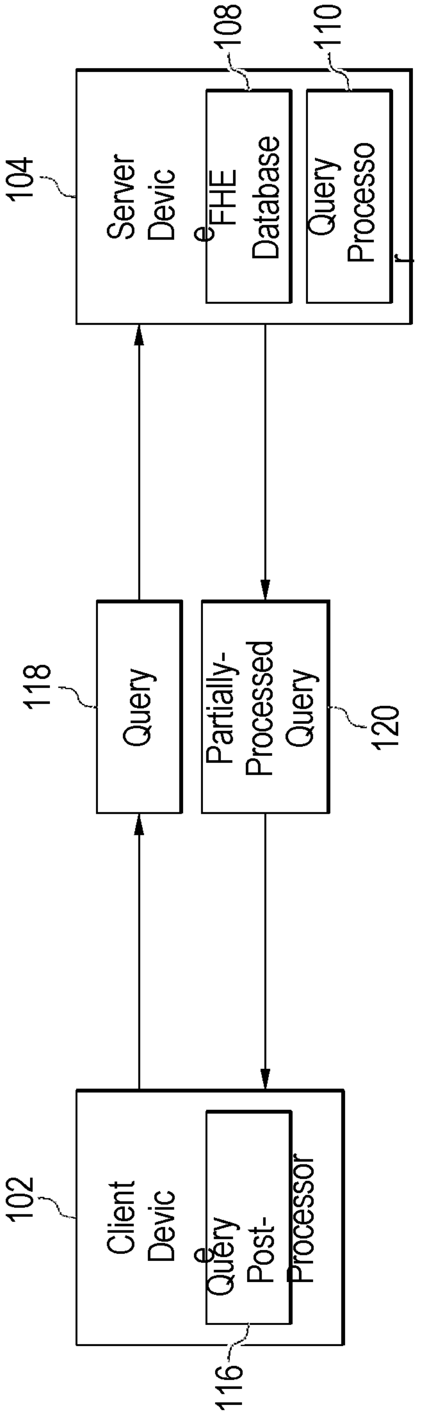
FIG. 1B is a block diagram of an example system for querying fully homomorphic encryption (FHE) encrypted databases using client-side post-processing.

With reference now to FIG. 1B, a block diagram shows an example system for querying fully homomorphic encryption (FHE) encrypted databases using client-side post-processing. The example system is generally referred to by the reference number 100B. FIG. 1B includes similarly numbered elements described in FIG. 1A. In addition, the client device 102 includes a query post-processor 116. The server device 104 in FIG. 1B is shown receiving a query 118 and sending partially-processed query 120 to the client device 102. For example, the partially-processed query 120 may be processed by the query post-processor 116 of the client device 102.

As described above in FIG. 1A, after the summation all the cipher texts for a regular sum query, the server device 104 may generate one cipher text that encrypts k values. As shown in the example of FIG. 1B, in various examples, to spare the inner-sum, which sums all elements in a cipher-text in FHE and has a high computational cost, the server device 104 can send the client device 102 the final single cipher text in the partially-processed query 120. The client device 102 can decrypt and then sum the decrypted values corresponding to the values in the cipher text. An example of such summation of a single cipher text is shown and described in FIG. 2 below. Because the client computational complexity is negligible and constant in k, sending the client device 102 this partially-processed query 120 may save considerable processing resources on the server device 104, while minimally impacting computing resources of the client device 102. Moreover, security is preserved without any increased risk of attacks.

Still referring to FIG. 1B, in various examples, the system 100B may be used to compute an average type query. For example, the query processor 110 can calculate both sum and count queries of the relevant columns and the server device 104 may send the results to the client device 102 as partially-processed query 120. The query post-processor 116 of the client device 102 can then calculate their division. Because the division is a hard function to calculate with FHE, while being a fast and constant calculation in n for the client device 102, considerable resources may be saved by shifting the processing of this function to the client device 102.

In various examples, the system 100B may be used to calculate standard deviation. For example, the following equation may be used to calculate standard deviation:

$$\sigma = \sqrt{E[X^2] - (E[X])^2} = \sqrt{\frac{\Sigma X^2}{N} - \frac{(\Sigma X)^2}{N^2}} \quad \text{Eq. 4}$$

where X is the filtered column, and N is the number of non-zero elements. In some examples, the server device 104 can compute the SUMs ΣX, ΣX2, and COUNT N with FHE and send the results as partially-processed query 120 to the client device 102. The query post-processor 116 of the client device 102 can then compute the standard deviation with a simple computation, as before. Again, because computing ΣX, ΣX2, and N with FHE may be much more inefficient than decrypting the values and computing these expressions on plaintext, substantial computing resources may be saved at the server device 104 with a small price paid at the user side.

It is to be understood that the block diagram of FIG. 1B is not intended to indicate that the system 100B is to include all of the components shown in FIG. 1B. Rather, the system 100B can include fewer or additional components not illustrated in FIG. 1B (e.g., additional client devices, queries, data, processors, or additional server devices, etc.).

Figure 2:
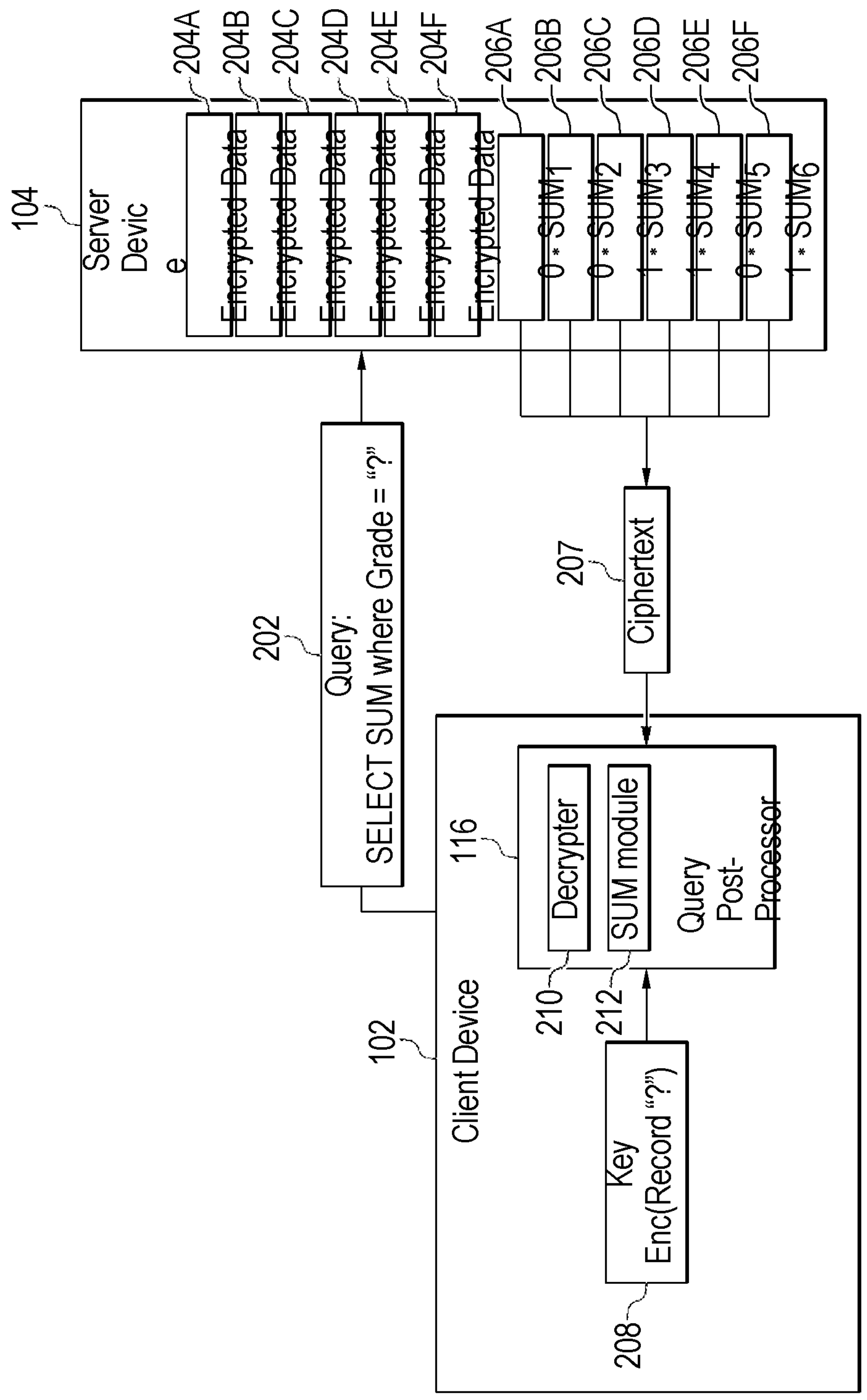
FIG. 2 is a block diagram of an example system for querying fully homomorphic encryption (FHE) encrypted databases with a SUM query using client-side post-processing.

FIG. 2 a block diagram shows an example system for querying fully homomorphic encryption (FHE) encrypted databases with a SUM query using client-side post-processing. In various examples, the example system 200 can be implemented using the system 100B of FIG. 1B. FIG. 2 includes a client device 102 communicatively coupled to a server device, similarly to FIG. 1B. The client device includes a query post processor 116. FIG. 2 includes a SUM type query 202 shown being sent from the client device 102 to the server device 104. The server device 104 includes encrypted data 204A-204F. For example, each of the encrypted data blocks 204A, 204B, 204C, 204D, 204E, 204F may be a ciphertext that includes a predetermined number of encrypted values. As one example, each of the ciphertexts may include 100 encrypted values. The server device 104 is shown generating ciphertexts 206A-206F corresponding to encrypted data 204A-204F, respectively. For example, each of the ciphertexts 206A-206F may be a ciphertext with a predetermined number of encrypted values. As one example, each ciphertext may include 100 encrypted values. The server device 104 is further shown generating and sending a partially-processed query data 207 to the client device 102. For example, the partially-processed query data 207 may be a single ciphertext that is the summation of the ciphertexts 206A-206F. The client device 102 includes a key 208. For example, the key 208 may be used to decrypt encrypted data 204A-204F.

In the example of FIG. 2, a user of client device 102 may input a SUM type query that is to sum together all values in a database where grade is equal to a particular value "?" For example, the SUM function may be used to sum together all values in a column of the database corresponding to rows including the particular value.

Still referring to FIG. 2, the client device 102 sends a query 202 of kind SUM that seeks to sum together all records where a grade is equal to a predetermined value "?". In various examples, the server device 104 may receive the query and partially process the query 202. For example, for every block of records 204A, 204B, 204C, 204D, 204E, 204F in the FHE database, the server device 104 may produce a ciphertext 206A-206F encrypting the selected queried field values in that block, yet un-summed. The server device 104 may also compute an indicator vector of 0s or 1s for each of the SUM blocks of ciphertexts 206A-206F. For example, the indicator may include 1's matching the rows of each block that correspond to the query condition. In various examples, the ciphertexts 206A-206F may then be produced by multiplying the indicator vector with the ciphertext that contain all the values of the queried field in the block. For example, ciphertexts 206A, 206B, and 206E may be assigned a value of 0 because they do not include a grade of "?" and ciphertexts 206C, 206D, and 206F may be assigned a value of 1 because they do include a grade of "?". In various examples, the computation of the 0 or 1 may be performed using an "is equal" query as described herein. The server device 104 may then execute a SUM operation for each of encrypted data blocks 204A, 204B, 204C, 204D, 204E, 204F. For example, the server device 104 may take the ciphertexts 206A-206F (one per block) and sum the ciphertexts 206A-206F together to produce a single ciphertext 207 with a partial sum of these queried field values, representing a partial sum of all the blocks corresponding to ciphertexts 206A-206F. The server device 104 may then compute a product between each assigned value for each ciphertext and the value in the summation column. For example, for ciphertexts 206A, 206B, and 206E the product may be 0 because the product is computed as 0 times the summation value. Similarly, the value of ciphertexts 206C, 206D, and 206F may be the summation value for the ciphertexts because the product is 1*summation value. The service device 104 may then sum together the corresponding values of remaining ciphertexts 206C, 206D, and 206F to generate a partially-processed query 207 containing a single ciphertext of summed values. For example, the resulting ciphertext 207 may be a block of 100 summed encrypted values. The server device 104 may then send this single ciphertext 207 to the client devise 102 to finish the summing operation by summing up all the slots inside this ciphertext 207.

In various examples, the client device 102 may then decrypt and sum together the values inside the received partially-processed query 207 containing the single block of summed ciphertexts. For example, the decrypter 210 of the client device 102 may decrypt each of the values of ciphertexts to be summed using the key 208. The SUM module 212 may perform a SUM operation on all the decrypted values. The load on the client device 102 may be reduced by only having to perform a single SUM on one block rather than six blocks 206A-206F. In particular, the sum carried out by the post-processing client device 102 has a complexity that is not dependent on the number of records in the database. Therefore, if the number of records in the database is R, then the post-processing optimization at the client device may incur a performance of complexity of order 1. Moreover, by letting the client 102 do the final summation, the server device 104 may also save the processing and time which otherwise may be spent using a "rotate-and-sum" algorithm at the server device 104.

In various examples, several other types of operations may be performed by the system 200. In some examples, the system 200 can execute a COUNT operation using client-side post-processing. For example, the client device 102 can receive the partially-processed query from the server device 104 and sum the indicator vector generated by the server device 104. For example, the indicator vector may be included in the partially-processed query and the summation of the indicator vector may be executed by the client device 102. As one example, the query 202 may thus instead be to COUNT pupils where grade=5.

In some examples, the system 200 can process an averaging (AVG) type query using client-side post-processing. As one example, the query 202 may be a request for an average grade value for pupils whose name begins with the letter "R". In this examples, the server device 104 may compute an indicator vector for blocks containing students whose name begins with the letter "R". The values of all the blocks containing such students may similarly be summed together by the server device 104 such that one block of summed values is received by the client device 102. However, the client device 102 may perform the division of the summed values after decrypting the values. Thus, the client device 102 may reduce the burden of performing division associated with working with homomorphic encryption scheme at the server device 104.

In some examples, the system 200 can process a standard deviation (STD) query using client-side post-processing. For example, the standard deviation may be calculated using Equation 4 described above. Again, the server device 104 can compute the SUMs ΣX, ΣX2, and COUNT N with FHE and send the results as partially-processed query to the client device 102. The query post-processor 116 of the client device 102 can then compute the division and square root portions of the standard deviation with less demanding computation. Again, because computing ΣX, ΣX2, and N with FHE may be much more inefficient than decrypting the values and computing these expressions on plaintext, computing resources may be saved overall, and particularly at the server device 104. Moreover, allowing the client device 102 to post-process the SUMs, ΣX, ΣX^2 and COUNT not only reduces runtime, but may also enable the computation of a query which would not be possible otherwise. This is because FHE schemes do not support square root and division operations used in computing some queries, such as the STD query.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional keys, encrypted data, elements in query post-processor, additional client devices, or additional resource servers, etc.).

Figure 3:
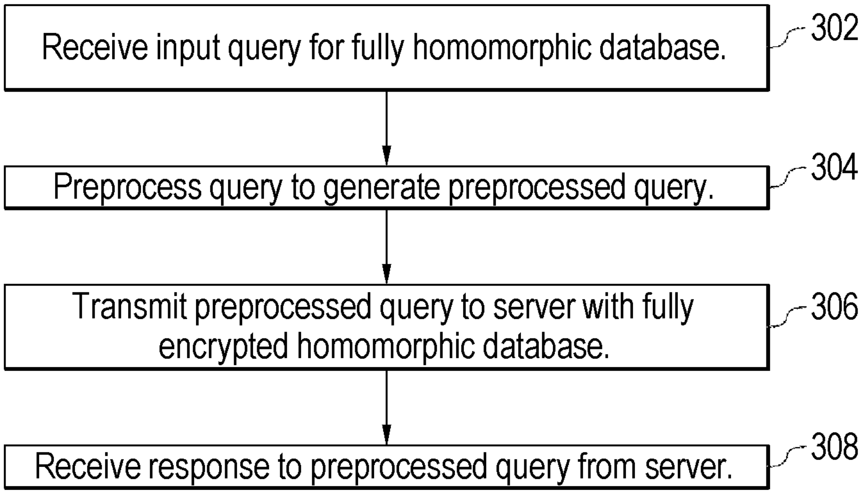
FIG. 3 is a block diagram of an example method that can query fully homomorphic encryption (FHE) encrypted databases using client-side preprocessing.

FIG. 3 is a process flow diagram of an example method that can query fully homomorphic encryption (FHE) encrypted databases using client-side preprocessing. The method 300 can be implemented with any suitable computing device, such as the computing device 700A of FIG. 7A and is described with reference to the system 100A of FIG. 1A. In various examples, the method 300 may be executed by a client device, such as the client device 102 of FIG. 1A. For example, the method described below can be implemented by the processor 702 or the processor 1002 of FIGS. 7A and 10A.

At block 302, a processor receives an input query for a fully homomorphic encryption (FHE) encrypted database. For example, the input query may be received via a processor of a client device. In various examples, the input query may be a comparison type query.

At block 304, the processor preprocesses the query to generate a preprocessed query. For example, the processor can calculate negated bit values of the binary representation of a value being compared by a query corresponding to the preprocessed query. In various examples, the negated bit values are to be used in an optimized hybrid bitwise comparison function.

At block 306, the preprocessed query is transmitted to a server with the FHE encrypted database. For example, the preprocessed query may be transmitted using any suitable network interface.

At block 308, a response to the preprocessed query is received from the server. For example, the response to a comparison type query may be a ciphertext of encrypted values.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
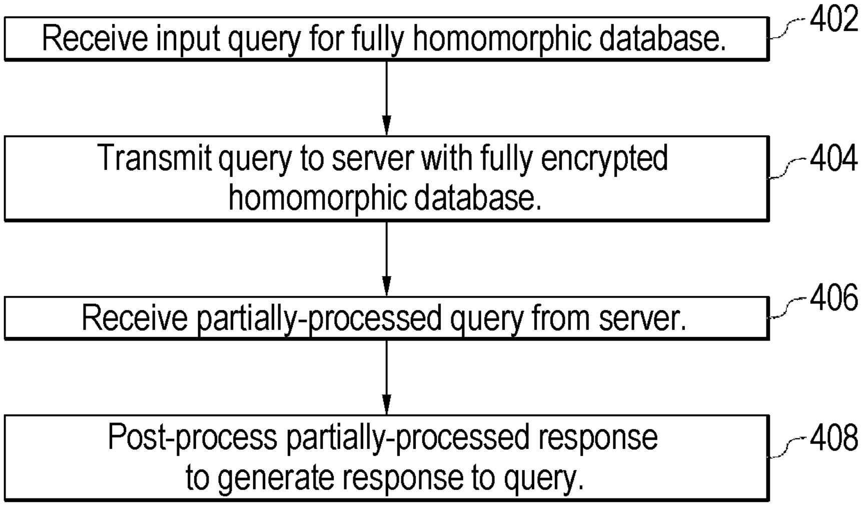
FIG. 4 is a block diagram of an example method that can query fully homomorphic encryption (FHE) encrypted databases using client-side post-processing.

FIG. 4 is a process flow diagram of an example method that can query fully homomorphic encryption (FHE) encrypted databases using client-side post-processing. The method 400 can be implemented with any suitable computing device, such as the computing device 700A of FIG. 7A and is described with reference to the system 100B of FIG. 1B. In various examples, the method 400 may be executed by a client device, such as the client device 102 of FIG. 1B. For example, the method 400 described below can be implemented by the processor 702 or the processor 1002 of FIGS. 7A and 10A.

At block 402, a processor receive an input query for a fully homomorphic encrypted database. For example, the processor may receive the input query at a client device. In various examples, the input query may be a COUNT query, a SUM query, an average query, a standard deviation query, among other types of queries.

At block 404, the processor transmits the query to a server with a fully encrypted homomorphic database. For example, the query may be transmitted via any suitable network interface.

At block 406, the processor receives a partially-processed query from the server. For example, the partially-processed query may include an indicator vector. In some examples, the partially-processed query may include summed blocks of ciphertexts.

At block 408, the processor post-processes the partially-processed query to generate a response to the query. For example, the processor can decrypt the partially-processed query. In various examples, the processor can sum decrypted values of the partially-processed query. In some examples, the processor can divide decrypted values of the partially-processed query by a number received in the partially-processed query. In various examples, the processor can sum values of an indicator vector. In some examples, the processor can calculate a division and square root portion of a standard deviation calculation for a standard deviation type query.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
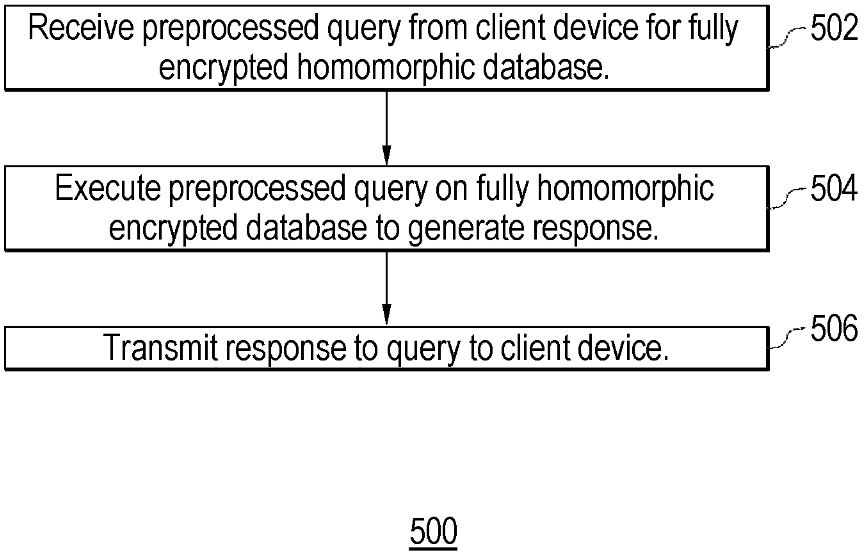
FIG. 5 is a block diagram of another example method that can query fully homomorphic encryption (FHE) encrypted databases using client-side preprocessing.

FIG. 5 is a process flow diagram of an example method that can query fully homomorphic encryption (FHE) encrypted databases using client-side preprocessing. The method 500 can be implemented with any suitable computing device, such as the computing device 700B of FIG. 7B and is described with reference to the system 100A of FIG. 1A. In various examples, the method 500 may be executed by a server device, such as the server device 104 of FIG. 1A. For example, the method 500 described below can be implemented by the processor 702 or the processor 1002 of FIGS. 7B and 10B.

At block 502, a processor receives a preprocessed query from a client device for a fully homomorphic encrypted database. For example, the preprocessed query may include negated bit values of the binary representation of the value being compared by the query. As one example, for the query "select SUM(salary) where age=40", the value 40 is 1010000 in binary representation. Instead of sending (7) encryptions of 1, 0, 1, 0, 0, 0, 0, the negated bit values may be used to send encryptions of 0, 1, 0, 1, 1, 1, 1. In some examples, the preprocessed query may be a comparison type query.

At block 504, the processor executes the preprocessed query on the fully homomorphic encrypted database to generate a response. For example, the preprocessed query may be executed using an optimized hybrid bitwise comparison function that includes a squaring of a summation of bitwise comparisons. In various examples, the negated bit values are to be used in the optimized hybrid bitwise comparison function.

At block 506, the processor transmits the response to the client device. For example, the response to a comparison type query may be a single ciphertext with partially summed values. To continue the example above, the response may be a single ciphertext with partially summed up salaries for the matching persons of age 40.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
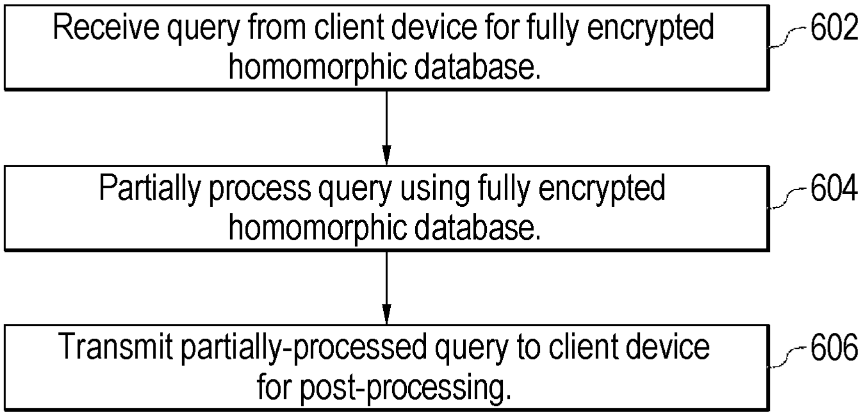
FIG. 6 is a block diagram of another example method that can query fully homomorphic encryption (FHE) encrypted databases using client-side post-processing.

FIG. 6 is a process flow diagram of an example method that can query fully homomorphic encryption (FHE) encrypted databases using client-side post-processing. The method 600 can be implemented with any suitable computing device, such as the computing device 700B of FIG. 7B and is described with reference to the system 100A of FIG. 1A. In various examples, the method 600 may be executed by a server device, such as the server device 104 of FIG. 1B. For example, the method 600 described below can be implemented by the processor 702 or the processor 1002 of FIGS. 7B and 10B.

At block 602, a processor receives a query from a client device for a fully homomorphic encrypted database. For example, the query may be a COUNT query, a SUM query an average type query, a standard deviation type query, or any other similar query.

At block 604, the processor partially processes the query using the fully homomorphic encrypted database. For example, the processor can calculate a sum of ciphertexts to be included in the partially-processed query. In some examples, the processor can calculate a count to be included in the partially-processed query. For example, the count can be calculated by summing an indicator vector generated by the processor.

At block 606, the processor transmits the partially-processed query to the client device. For example, the partially-processed query may include a sum of ciphertexts, a count, or an indicator vector.

The process flow diagram of FIG. 6 is not intended to indicate that the operations of the method 600 are to be executed in any particular order, or that all of the operations of the method 600 are to be included in every case. Additionally, the method 600 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7A:
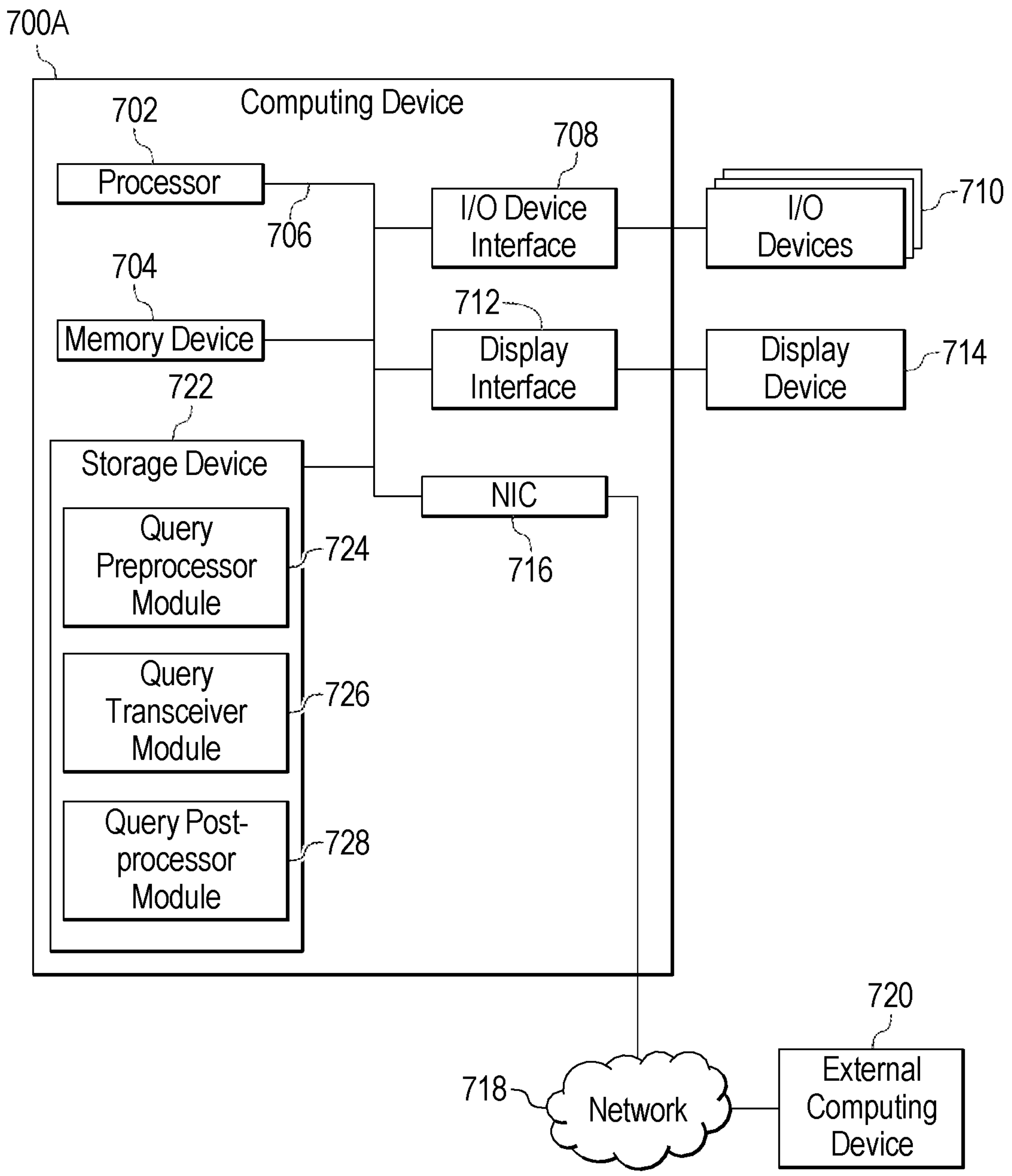
FIG. 7A is a block diagram of an example computing device that can query fully homomorphic encryption (FHE) encrypted databases using client-side processing.

FIG. 7A is block diagram of an example computing device that can query fully homomorphic encryption (FHE) encrypted databases using client-side processing. The computing device 700A may be for example, a desktop computer, laptop computer, tablet computer, or smartphone. Computing device 700A may be described in the general context of computer system executable instructions, such as program modules, being executed by a computer system. Generally, program modules may include routines, programs, objects, components, logic, data structures, and so on that perform particular tasks or implement particular abstract data types. Computing device 700A may be practiced in distributed cloud computing environments where tasks are performed by remote processing devices that are linked through a communications network. In a distributed cloud computing environment, program modules may be located in both local and remote computer system storage media including memory storage devices.

The computing device 700A may include a processor 702 that is to execute stored instructions, a memory device 704 to provide temporary memory space for operations of said instructions during operation. The processor can be a single-core processor, multi-core processor, computing cluster, or any number of other configurations. The memory 704 can include random access memory (RAM), read only memory, flash memory, or any other suitable memory systems.

The processor 702 may be connected through a system interconnect 706 (e.g., PCI®, PCI-Express®, etc.) to an input/output (I/O) device interface 708 adapted to connect the computing device 700 to one or more I/O devices 710. The I/O devices 710 may include, for example, a keyboard and a pointing device, wherein the pointing device may include a touchpad or a touchscreen, among others. The I/O devices 710 may be built-in components of the computing device 700, or may be devices that are externally connected to the computing device 700.

The processor 702 may also be linked through the system interconnect 706 to a display interface 712 adapted to connect the computing device 700 to a display device 714. The display device 714 may include a display screen that is a built-in component of the computing device 700. The display device 714 may also include a computer monitor, television, or projector, among others, that is externally connected to the computing device 700. In addition, a network interface controller (NIC) 716 may be adapted to connect the computing device 700A through the system interconnect 706 to the network 718. In some embodiments, the NIC 716 can transmit data using any suitable interface or protocol, such as the internet small computer system interface, among others. The network 718 may be a cellular network, a radio network, a wide area network (WAN), a local area network (LAN), or the Internet, among others. An external computing device 720 may connect to the computing device 700A through the network 718. In some examples, external computing device 720 may be an external webserver 720. In some examples, external computing device 720 may be a cloud computing node.

The processor 702 may also be linked through the system interconnect 706 to a storage device 722 that can include a hard drive, an optical drive, a USB flash drive, an array of drives, or any combinations thereof. In some examples, the storage device 722 may include a query preprocessor module 724, a query transceiver module 726, and a query post-processor module 728. The query preprocessor module 724 can receive a query for a fully homomorphic encryption (FHE) encrypted database. The query preprocessor module 724 can preprocess the query to generate a preprocessed query. The transceiver module 726 can transmit the preprocessed query to a server with the fully homomorphic encrypted database. The transceiver module 726 can then receive a response to the preprocessed query from the server. In some examples, the transceiver module 726 can transmit the query to a server with the fully homomorphic encrypted database. The transceiver module 726 can then receive a partially-processed query from the server. The query post-processor module 728 can post-process the partially-processed query to generate a response to the query. For example, the query post-processor module 728 can execute a decryption, a multiplication, a division, or a square root on the partially-processed query.

It is to be understood that the block diagram of FIG. 7A is not intended to indicate that the computing device 700A is to include all of the components shown in FIG. 7A. Rather, the computing device 700A can include fewer or additional components not illustrated in FIG. 7A (e.g., additional memory components, embedded controllers, modules, additional network interfaces, etc.). Furthermore, any of the functionalities of the query preprocessor 724, the query transmitter module 726, and the query post-processor module 728 may be partially, or entirely, implemented in hardware and/or in the processor 702. For example, the functionality may be implemented with an application specific integrated circuit, logic implemented in an embedded controller, or in logic implemented in the processor 702, among others. In some embodiments, the functionalities of the query preprocessor module 724, the query transceiver module 726, and the query post-processor module 728 can be implemented with logic, wherein the logic, as referred to herein, can include any suitable hardware (e.g., a processor, among others), software (e.g., an application, among others), firmware, or any suitable combination of hardware, software, and firmware.

Figure 7B:
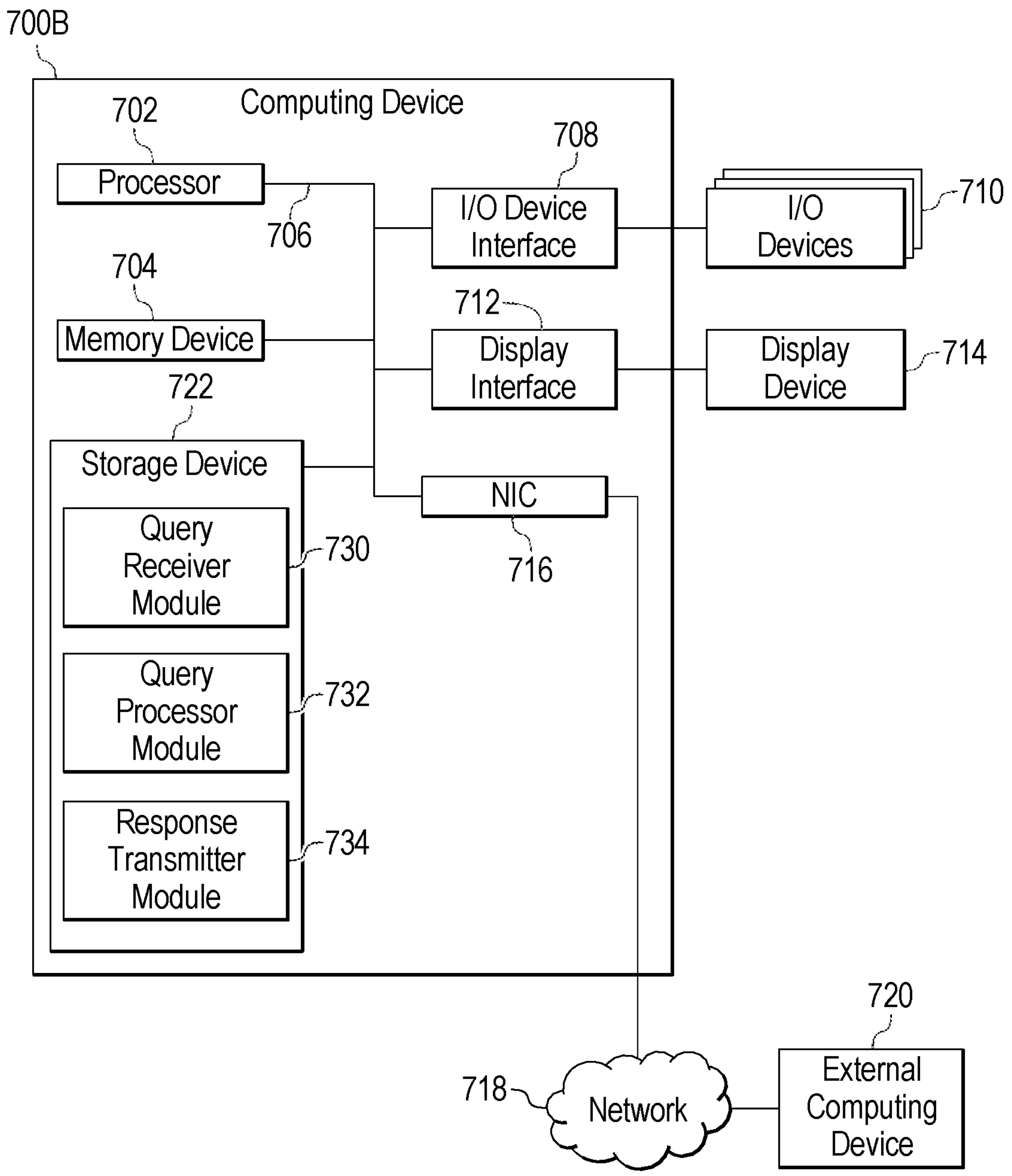
FIG. 7B is a block diagram of another example computing device that can query fully homomorphic encryption (FHE) encrypted databases using client-side processing.

FIG. 7B is a block diagram of another example computing device that can query fully homomorphic encryption (FHE) encrypted databases using client-side processing. The computing device 700B may be for example, a server device. In some examples, computing device 700A may be a cloud computing node. The computing device 700B of FIG. 7B includes similarly numbered elements of computing device 700A of FIG. 7A. In addition, the storage device 722 may include a query receiver module 730, a query processor module 732, and a response transmitter module 734. The query receiver module 730 can receive a query from a client device for a fully homomorphic encryption (FHE) encrypted database. For example, the query may be a comparison type query, a sum type query, a count type query, an average type query, or a standard deviation type query. In various examples, the query receiver module 730 can receive a preprocessed query from a client device for a fully homomorphic encryption (FHE) encrypted database. For example, the preprocessed query may be a comparison type query. In some examples, the preprocessed query may include negated bit values of the binary representation of a value being compared by a query corresponding to the preprocessed query to be used in an optimized hybrid bitwise comparison, such as the comparison described in Eq. 2. The query processor module 732 can process the query using the FHE encrypted database. In some examples, the query processor module 732 can partially-process the query to generate a partially-processed query. For example, the query processor module 732 can calculate a sum to be included in the partially-processed query. In some examples, the query processor module 732 can generate an indicator vector for the partially-processed query. In various examples, the query processor module 732 can calculate a count to be included in the partially-processed query. In various examples, the partially-processed query may have encryption, division, or some summation left to be performed. In some examples, the query processor module 732 can execute an optimized hybrid bitwise comparison in response to receiving a preprocessed comparison query. For example, the optimized hybrid bitwise comparison may include execution of a single squaring of a summation of bitwise comparisons. The response transmitter module 734 can transmit the response to the client device. In various examples, the response transmitter module 728 can also transmit the partially-processed query to the client device.

It is to be understood that the block diagram of FIG. 7B is not intended to indicate that the computing device 700B is to include all of the components shown in FIG. 7B. Rather, the computing device 700B can include fewer or additional components not illustrated in FIG. 7B (e.g., additional memory components, embedded controllers, modules, additional network interfaces, etc.). Furthermore, any of the functionalities of the query receiver module 730, the query processor module 732, and the response transmitter module 734 may be partially, or entirely, implemented in hardware and/or in the processor 702. For example, the functionality may be implemented with an application specific integrated circuit, logic implemented in an embedded controller, or in logic implemented in the processor 702, among others. In some embodiments, the functionalities of the query receiver module 730, the query processor module 732, and the response transmitter module 734 can be implemented with logic, wherein the logic, as referred to herein, can include any suitable hardware (e.g., a processor, among others), software (e.g., an application, among others), firmware, or any suitable combination of hardware, software, and firmware.

Figure 8:
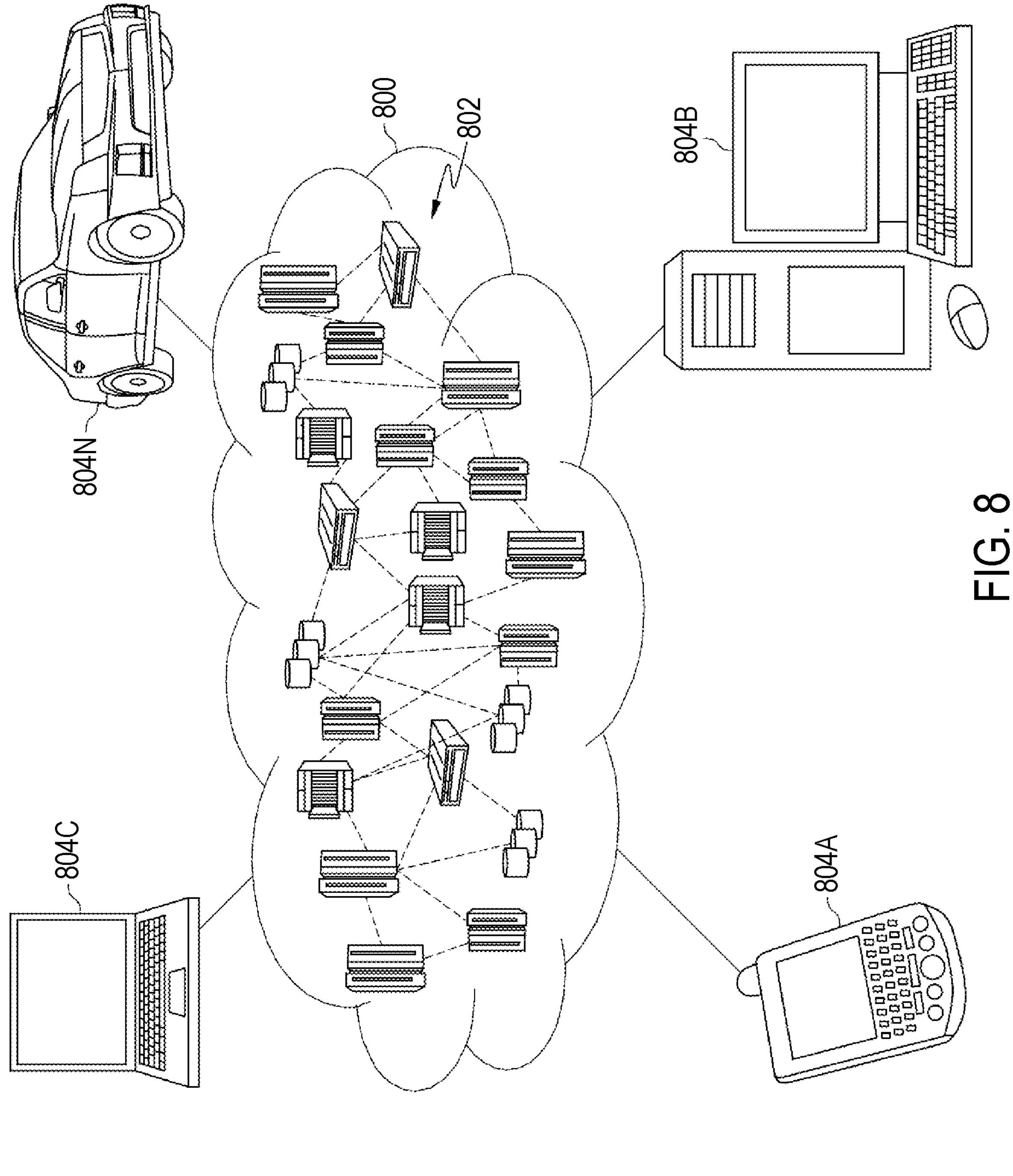
FIG. 8 is a diagram of an example cloud computing environment according to embodiments described herein.

Referring now to FIG. 8, illustrative cloud computing environment 800 is depicted. As shown, cloud computing environment 800 includes one or more cloud computing nodes 802 with which local computing devices used by cloud consumers, such as, for example, personal digital assistant (PDA) or cellular telephone 804A, desktop computer 804B, laptop computer 804C, and/or automobile computer system 804N may communicate. Nodes 802 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms and/or software as services for which a cloud consumer does not need to maintain resources on a local computing device. It is understood that the types of computing devices 804A-N shown in FIG. 8 are intended to be illustrative only and that computing nodes 802 and cloud computing environment 800 can communicate with any type of computerized device over any type of network and/or network addressable connection (e.g., using a web browser).

Figure 9:
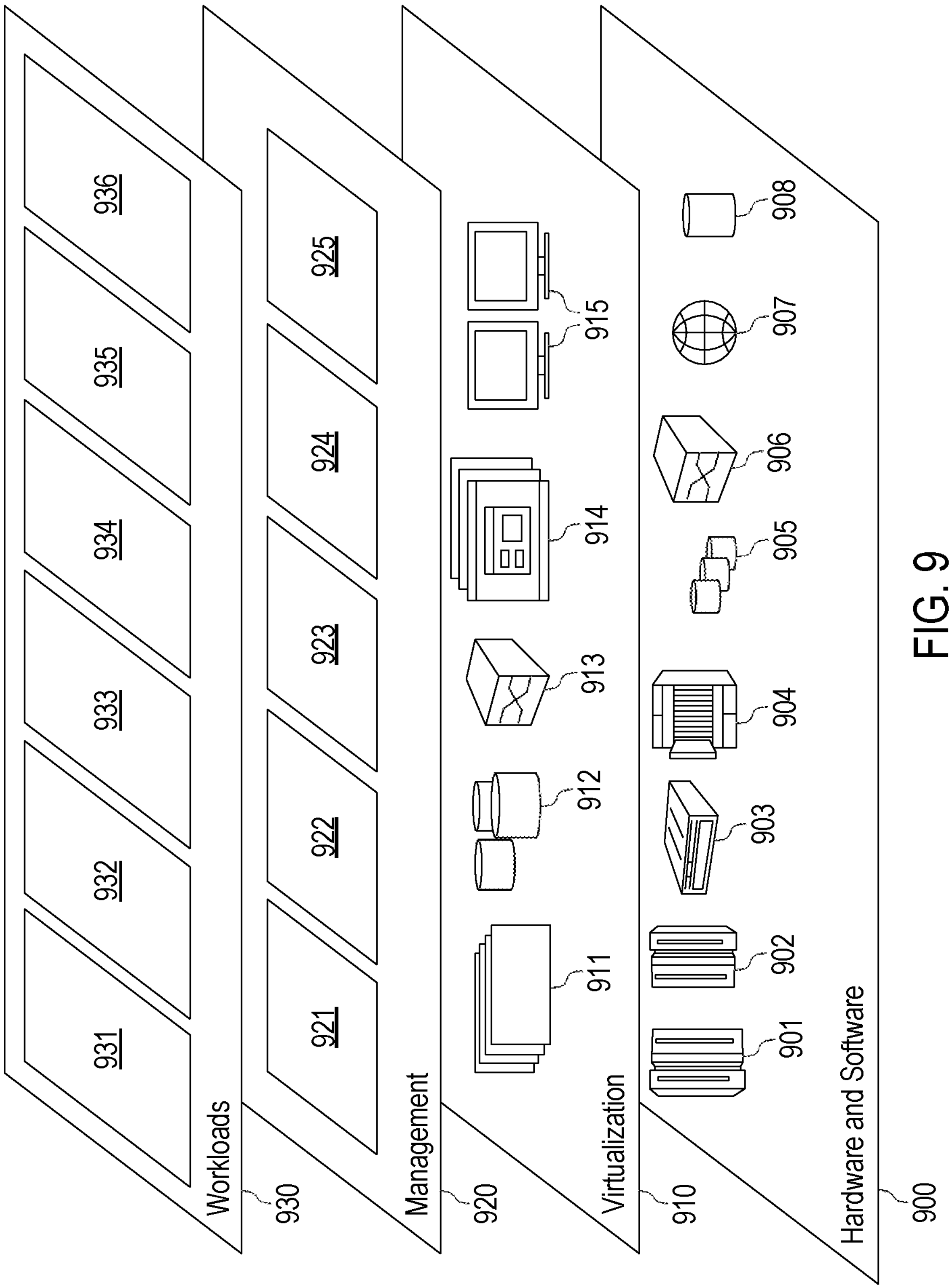
FIG. 9 is a diagram of an example abstraction model layers according to embodiments described herein.

Referring now to FIG. 9, a set of functional abstraction layers provided by cloud computing environment 800 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 900 includes hardware and software components. Examples of hardware components include: mainframes 901; RISC (Reduced Instruction Set Computer) architecture based servers 902; servers 903; blade servers 904; storage devices 905; and networks and networking components 906. In some embodiments, software components include network application server software 907 and database software 908.

Virtualization layer 910 provides an abstraction layer from which the following examples of virtual entities may be provided: virtual servers 911; virtual storage 912; virtual networks 913, including virtual private networks; virtual applications and operating systems 914; and virtual clients 915.

In one example, management layer 920 may provide the functions described below. Resource provisioning 921 provides dynamic procurement of computing resources and other resources that are utilized to perform tasks within the cloud computing environment. Metering and Pricing 922 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 923 provides access to the cloud computing environment for consumers and system administrators. Service level management 924 provides cloud computing resource allocation and management such that required service levels are met. Service Level Agreement (SLA) planning and fulfillment 925 provide pre-arrangement for, and procurement of, cloud computing resources for which a future requirement is anticipated in accordance with an SLA.

Workloads layer 930 provides examples of functionality for which the cloud computing environment may be utilized. Examples of workloads and functions which may be provided from this layer include: mapping and navigation 931; software development and lifecycle management 932; virtual classroom education delivery 933; data analytics processing 934; transaction processing 935; and fully homomorphic encryption (FHE) encrypted database processing 936.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 10A:
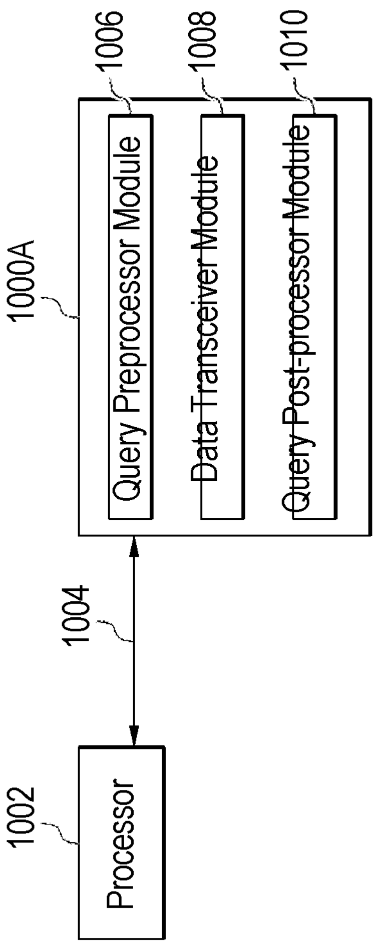
FIG. 10A is an example tangible, non-transitory computer-readable medium that can query fully homomorphic encryption (FHE) encrypted databases using client-side processing.

Referring now to FIG. 10A, a block diagram is depicted of an example tangible, non-transitory computer-readable medium 1000 that can query fully homomorphic encryption (FHE) encrypted databases using client-side processing. The tangible, non-transitory, computer-readable medium 1000 may be accessed by a processor 1002 over a computer interconnect 1004. Furthermore, the tangible, non-transitory, computer-readable medium 1000 may include code to direct the processor 1002 to perform the operations of the methods 400 or 500 of FIGS. 4 and 5.

The various software components discussed herein may be stored on the tangible, non-transitory, computer-readable medium 1000A, as indicated in FIG. 10A. For example, a query preprocessor 1006 includes code to receive a query for a fully homomorphic encrypted database. The query preprocessor module 1006 also includes code to preprocess the query to generate a preprocessed query. A data transceiver module 1008 includes code to transmit the preprocessed query to a server with the fully homomorphic encryption (FHE) encrypted database. The data transceiver module 1008 further includes code to receive a response to the preprocessed query from the server. A query post-processor module 1010 includes code to post-process the response from the server, where the response includes a partially-processed query. In various examples, the query post-processor module 1010 also includes code to decrypt the partially-processed query. In some examples, the query post-processor module 1010 also includes code to sum decrypted values of the partially-processed query. In some examples, the query post-processor module 1010 also includes code to divide decrypted values of the partially-processed query by a number received in the partially-processed query.

Figure 10B:
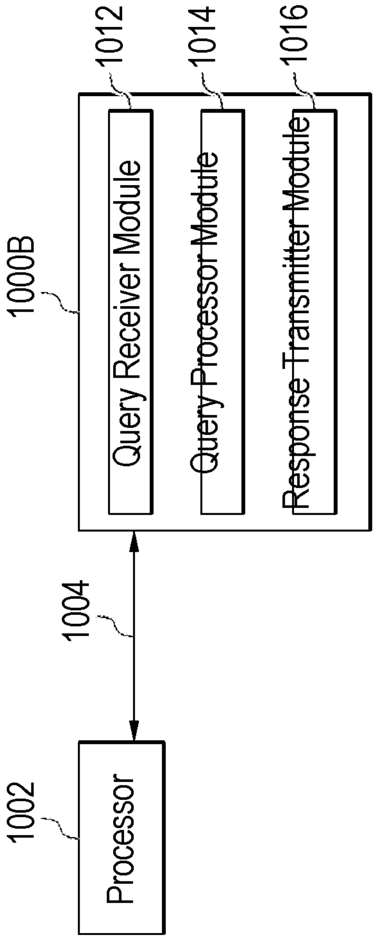
FIG. 10B is another example tangible, non-transitory computer-readable medium that can query fully homomorphic encryption (FHE) encrypted databases using client-side processing.

Referring now to FIG. 10B, a block diagram is depicted of another example tangible, non-transitory computer-readable medium 1000B that can query fully homomorphic encryption (FHE) encrypted databases using client-side processing. The tangible, non-transitory, computer-readable medium 1000B may be accessed by a processor 1002 over a computer interconnect 1004. Furthermore, the tangible, non-transitory, computer-readable medium 1000 may include code to direct the processor 1002 to perform the operations of the method 600 or 700 of FIGS. 6 and 7.

The various software components discussed herein may be stored on the tangible, non-transitory, computer-readable medium 1000B, as indicated in FIG. 10B. For example, a query receiver module 1012 includes code to receive a preprocessed query from a client device for a fully homomorphic encryption (FHE) encrypted database. In various examples, the query receiver module 1012 also includes code to receive unprocessed queries from the client device. A query processor module 1014 includes code to execute the preprocessed query on the FHE encrypted database to generate a response. The module 1008 further includes code to partially-process unprocessed queries from the client device. For example, the query processor module 1014 includes code to calculate a count to be included in a partially-processed query. A response transmitter module 1016 includes code to transmit the response to the client device. In various examples, the response transmitter module 1016 also includes code to transmit partially-processed queries to the client device.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIGS. 10A and 10B may be included within the tangible, non-transitory, computer-readable medium 1000A or 1000B, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:

receive a preprocessed query from a client device for a fully homomorphic encryption (FHE) encrypted database, wherein a comparison column of the FHE encrypted database comprises values stored as encrypted binary representation;

execute the preprocessed query on the FHE encrypted database to generate a response; and transmit the response to the client device.

2. The system of claim 1, wherein the preprocessed query comprises negated bit values of the binary representation of a value being compared by a query corresponding to the preprocessed query.

3. The system of claim 1, wherein the preprocessed query is executed using an optimized hybrid bitwise comparison function that comprises a squaring of a summation of bitwise comparisons, wherein negated bit values are used in the optimized hybrid bitwise comparison function.

4. The system of claim 1, wherein the query comprises a comparison, where the response is a single ciphertext with partially summed values.

5. A system, comprising a processor to:

receive a query from a client device for a fully homomorphic encryption (FHE) encrypted database, wherein a comparison column of the FHE encrypted database comprises values stored as encrypted binary representation;

partially process the query using the FHE encrypted database; and transmit the partially-processed query to the client device.

6. The system of claim 5, wherein the processor is to calculate a sum of ciphertexts to be included in the partially-processed query.

7. The system of claim 5, wherein the processor is to calculate a count to be included in the partially-processed query by summing an indicator vector generated by the processor.

8. The system of claim 5, wherein the query comprises an average query, and wherein the processor is to calculate a sum and a count for the standard deviation query.

9. The system of claim 5, wherein the query comprises a standard deviation query, and wherein the processor is to calculate a sum and a count for the standard deviation query.

10. A computer-implemented method, comprising:

receiving, via a processor, an input query for a fully homomorphic encryption (FHE) encrypted database, wherein a comparison column of the FHE encrypted database comprises values stored as encrypted binary representation;

preprocessing, via the processor, the query to generate a preprocessed query;

transmitting, via the processor, the preprocessed query to a server with the fully homomorphic encrypted database; and receiving, via the processor, a response to the preprocessed query from the server.

11. The computer-implemented method of claim 10, wherein preprocessing the query comprises calculating negated bit values of the binary representation of a value being compared by a query corresponding to the preprocessed query.

12. The computer-implemented method of claim 11, wherein the negated bit values are to be used in an optimized hybrid bitwise comparison function.

13. The computer-implemented method of claim 10, wherein the input query comprises a comparison, wherein the response is a ciphertext of encrypted values.

14. The computer-implemented method of claim 10, further comprising:

post-processing, via the processor, the response from the server, wherein the response comprises a partially-processed query.

15. A computer-implemented method, comprising:

receiving, via a processor, a query for a fully homomorphic encrypted database, wherein a comparison column of the FHE encrypted database comprises values stored as encrypted binary representation;

transmitting, via the processor, the query to a server with the fully homomorphic encrypted database;

receiving, via the processor, a partially-processed query from the server; and post-processing, via the processor, the partially-processed query to generate a response to the query.

16. The computer-implemented method of claim 15, wherein post-processing the partially-processed query comprises decrypting the partially-processed query.

17. The computer-implemented method of claim 16, wherein post-processing the partially-processed query comprises summing decrypted values of the partially-processed query.

18. The computer-implemented method of claim 16, wherein post-processing the partially-processed query comprises dividing decrypted values of the partially-processed query by a number received in the partially-processed query.

19. The computer-implemented method of claim 15, wherein post-processing the partially-processed query comprises summing values of an indicator vector.

20. The computer-implemented method of claim 15, wherein post-processing the partially-processed query comprises calculating a division and square root portion of a standard deviation calculation.

21. A computer program product for querying fully homomorphic encryption encrypted databases, the computer program product comprising a computer-readable storage medium having program code embodied therewith, wherein the computer-readable storage medium is not a transitory signal per se, the program code executable by a processor to cause the processor to:

receive a query for a fully homomorphic encrypted database, wherein a comparison column of the FHE encrypted database comprises values stored as encrypted binary representation;

preprocess the query to generate a preprocessed query;

transmit the preprocessed query to a server with the fully homomorphic encryption (FHE) encrypted database; and receive a response to the preprocessed query from the server.

22. The computer program product of claim 21, further comprising program code executable by the processor to post-process the response from the server, wherein the response comprises a partially-processed query.

23. The computer program product of claim 22, further comprising program code executable by the processor to decrypt the partially-processed query.

24. The computer program product of claim 22, further comprising program code executable by the processor to sum decrypted values of the partially-processed query.

25. The computer program product of claim 22, further comprising program code executable by the processor to divide decrypted values of the partially-processed query by a number received in the partially-processed query.

* * * * *